(12) United States Patent
Dinant et al.

(10) Patent No.: US 10,744,961 B2
(45) Date of Patent: Aug. 18, 2020

(54) TRIM ELEMENT COMPRISING A DEFORMABLE OUTER SURFACE

(71) Applicant: Faurecia Interieur Industrie, Nanterre (FR)

(72) Inventors: Bruno Dinant, Saint-Brice-sous-Foret (FR); Othmane Faik, La Wantzenau (FR); Hugo Bonvalet, Karlsruhe (DE)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 95 days.

(21) Appl. No.: 16/128,175

(22) Filed: Sep. 11, 2018

(65) Prior Publication Data

US 2019/0077336 A1    Mar. 14, 2019

(30) Foreign Application Priority Data

Sep. 11, 2017  (FR) .................................... 17 58375

(51) Int. Cl.
  *B60R 13/02*   (2006.01)
  *B60N 2/75*   (2018.01)
(52) U.S. Cl.
  CPC .......... *B60R 13/0256* (2013.01); *B60N 2/763* (2018.02); *B60N 2/78* (2018.02); *B60R 13/02* (2013.01); *B60N 2/75* (2018.02)
(58) Field of Classification Search
  CPC ..... B62D 25/14; B60R 13/0256; B60R 13/02; B60N 2/763; B60N 2/78
  USPC .................................................. 296/1.08, 70
  See application file for complete search history.

(56) References Cited

U.S. PATENT DOCUMENTS

| 5,816,645 | A | * | 10/1998 | Grimes | ..................... | B60N 2/78 |
| | | | | | | 296/153 |
| 6,893,077 | B1 | * | 5/2005 | DeJongh | ............ | B60N 2/42709 |
| | | | | | | 296/187.05 |
| 9,180,830 | B1 | * | 11/2015 | Faruque | .............. | B60R 13/0243 |
| 2006/0163933 | A1 | * | 7/2006 | Radu | ...................... | B60N 2/777 |
| | | | | | | 297/411.35 |
| 2012/0241312 | A1 | * | 9/2012 | Keefe | ..................... | B29C 59/02 |
| | | | | | | 204/242 |
| 2019/0077335 | A1 | * | 3/2019 | Pegorier | .................. | B60N 2/77 |

(Continued)

FOREIGN PATENT DOCUMENTS

| DE | 102004004660 A1 | 9/2005 |
| DE | 102004059874 A1 | 6/2006 |

(Continued)

OTHER PUBLICATIONS

French Search Report corresponding to FR application No. 1758375, dated May 25, 2018, 2 pages.

*Primary Examiner* — Jason S Morrow
(74) *Attorney, Agent, or Firm* — Reising Ethington P.C.

(57) ABSTRACT

A trim element includes a body defining an outer surface of the trim element, at least part of the body being deformable and having a deformable guide surface extending in a first direction. The trim element further includes at least one actuating element having an actuating segment extending non-rectilinearly in the first direction. The actuating segment cooperates with the guide surface in an actuating area, the guide surface adopting the shape of the actuating segment in the actuating area. The actuating segment is movable relative to the body in the first direction such that the actuating area is movable and the body deforms when the actuating element is moved in the first direction.

11 Claims, 3 Drawing Sheets

(56) References Cited

U.S. PATENT DOCUMENTS

2019/0106030 A1\*  4/2019  Kim ..................... B60N 2/914
2019/0255948 A1\*  8/2019  Dinant ............... B60R 11/0235

FOREIGN PATENT DOCUMENTS

DE   102013209913 A1     12/2013
DE   102018202535 A1 \*   8/2019  ............. B60R 19/02
FR       3076507 A1 \*   7/2019  ............. B60R 13/02

\* cited by examiner

TRIM ELEMENT COMPRISING A DEFORMABLE OUTER SURFACE

FIELD OF THE INVENTION

The present invention relates to a trim element, of the type comprising a body defining the outer surface of the trim element, at least part of said body being deformable, such that the deformation of said part of the body causes a modification of the shape of the outer surface of the trim element, said body comprising a deformable guide surface extending in a first direction.

BACKGROUND

Trim elements with a deformable outer surface are known. Such trim elements for example make it possible to modify the position of a support surface, such as an armrest, protruding from the outer surface, or to modify the appearance of the outer surface based on specific uses of the vehicle.

Such a modification of the shape of the outer surface can be obtained by arranging inflatable elements below the outer surface and controlling the inflation of these elements to create a raised area opposite an inflated element.

Such a pneumatic system is, however, not satisfactory for several reasons.

It is in fact difficult to obtain the desired rigidity of the outer surface over an inflated element, which makes the system relatively unsuitable for forming a support surface. Furthermore, the feel of the outer surface is not satisfactory, since it is not uniform over the entire outer surface, the latter being rigid in the non-inflated areas and less rigid over an inflated element.

Furthermore, while a pneumatic system is suitable for forming raised areas protruding from the outer surface, it is less practical for forming hollow areas.

SUMMARY

One of the aims of the invention is to offset these drawbacks by proposing a trim element whereof the outer surface can be modified according to the desired shape and without modifying its rigidity.

To that end, the invention relates to a trim element of the aforementioned type, further comprising at least one actuating element comprising an actuating segment extending non-rectilinearly in the first direction, said actuating segment cooperating with the guide surface in an actuating area, the guide surface adopting the shape of the actuating segment in said actuating area, the actuating segment being movable relative to the body in the first direction such that the actuating area is movable and the body deforms when the actuating element is moved in the first direction relative to the body.

Using an actuating element that is movable relative to the body to change the shape thereof makes it possible to have an identical rigidity for the entire outer surface, namely inside and outside the actuating area. Furthermore, by adapting the shape of the actuating segment, it is possible to create the desired shape in the outer surface, both protruding and hollow.

Various embodiments of the trim element according to the invention may have any one or more of the following features, considered alone or according to any technically possible combination:

- the guide surface is formed by a series of strips adjacent to one another in the first direction, each strip being deformable relative to the rest of the body in a second direction substantially perpendicular to the first transverse direction, the actuating area extending over at least two of said strips;
- each strip is resiliently deformable relative to the rest of the body;
- the actuating segment comprises at least a first portion extending rectilinearly in the first direction and a second portion extending rectilinearly in the first direction, the first portion and the second portion being offset relative to one another in the second direction, at least one strip cooperating with the first portion and at least one other strip cooperating with the second portion in the actuating area;
- the actuating segment comprises at least a third portion extending between the first and second portions, said third portion being inclined between the first and second portions, at least one other strip cooperating with the third portion in the actuating area;
- the trim element comprises at least two actuating elements movable independently of one another or in a coordinated manner in the first direction relative to the body, each actuating element cooperating with a part of the guide surface of the body in two separate actuating areas;
- the actuating elements are movable relative to one another between a close position, in which the actuating areas are adjacent to one another, and a separated position, in which the actuating areas are separated from one another;
- the actuating elements are movable in a coordinated manner between at least a first position and a second position, the actuating areas moving together in the first direction between the first and second positions;
- the actuating segments have a shape such that the outer surface of the trim element has a basin shape between the actuating areas; and
- the guide surface, respectively the actuating segment, has a rail shape, the actuating segment, respectively the actuating surface, being inserted into said rail in the actuating area and extending outside the rail outside the actuating area.

BRIEF DESCRIPTION OF THE DRAWINGS

Other aspects and advantages of the invention will appear upon reading the following description, provided as an example, and done in reference to the appended drawings, in which.

DETAILED DESCRIPTION

Figure 1:
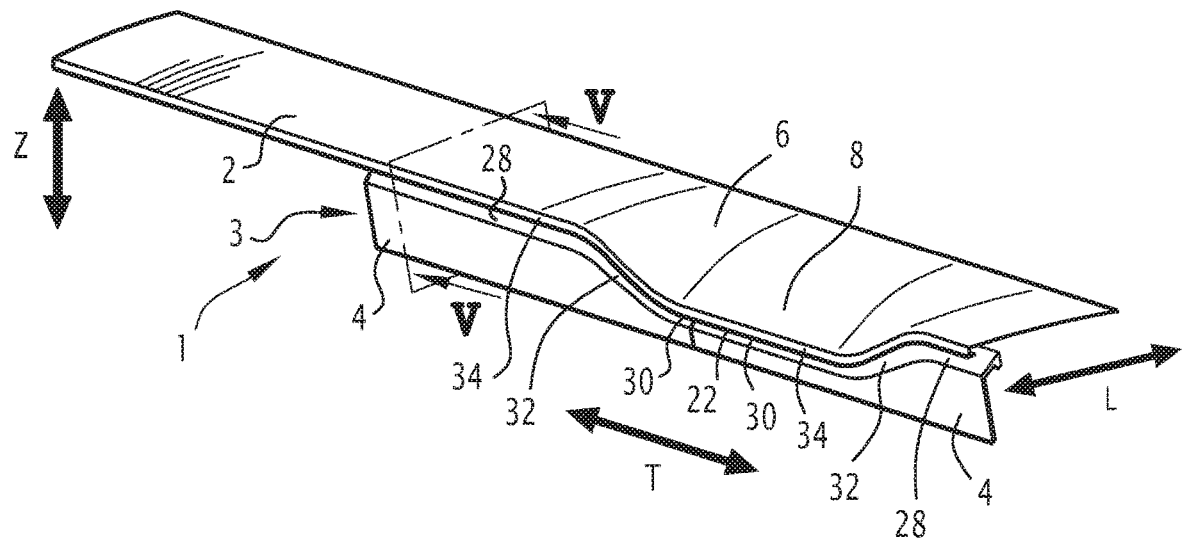
FIG. 1 is a schematic perspective illustration of a trim element according to an embodiment of the invention, the outer surface having a first shape.
Figure 2:
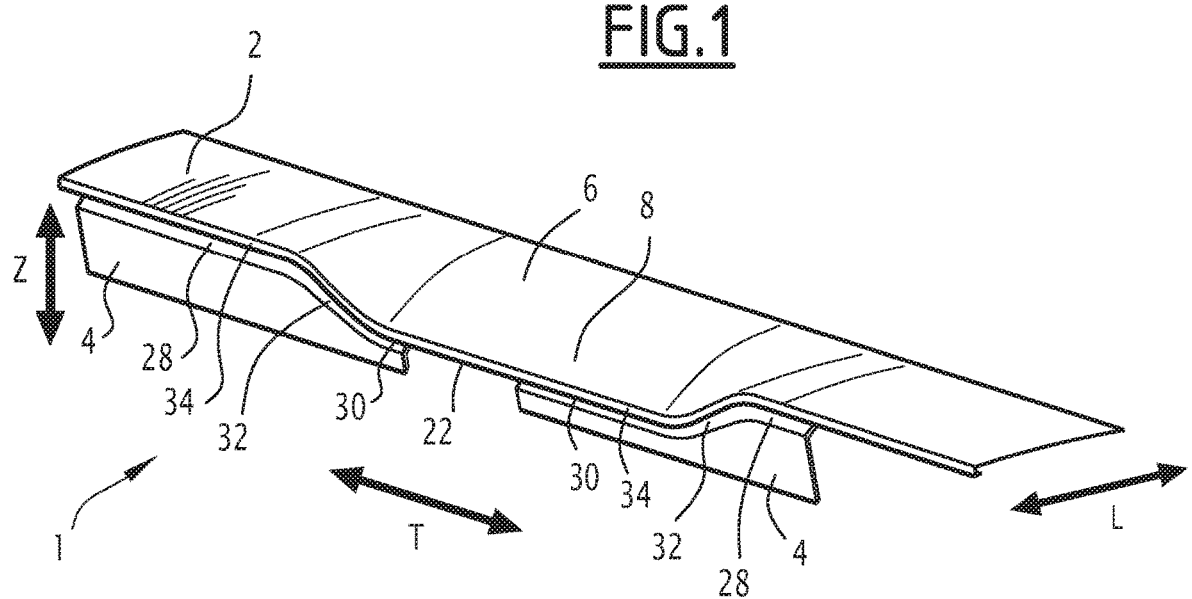
FIG. 2 is a schematic perspective illustration of the trim element of FIG. 1, the outer surface having a second shape.

In reference to FIGS. 1 and 2, a trim element 1 is described, comprising a body 2 and at least one actuating device 3 comprising at least two actuating elements 4.

An elevation direction Z is defined, for example, according to the usual direction in a vehicle, i.e. the direction perpendicular to the rolling plane of the vehicle in which the trim element is intended to be installed. The terms "top" and "bottom" are defined according to the elevation direction in the usual way.

The longitudinal X and transverse Y directions are also defined perpendicular to the elevation direction Z in the usual way in a vehicle. The expressions "front" and "rear", "left" and "right" will be used hereinafter relative to the normal movement direction of the vehicle.

The body 2 defines the outer surface 6 of the trim element 1, i.e., the visible surface of the trim element 1, for example from the passenger compartment of the vehicle in which the trim element 1 is installed. "Defines the outer surface" means that the outer surface 6 follows the shape of a surface of the body 2. In other words, the outer surface 6 can be formed by the body 2 or by a decorative layer extending over the body 2 and adopting the shape of a surface of the body 2. The body 2 is for example a vehicle dashboard body or a door panel or the like.

At least one area 8 of the body 2 is deformable under the effect of an actuation, as will be described later, such that the shape of the surface of the body defining that of the outer surface 6 can be changed in the deformable area 8. The deformation is for example resilient, so that the deformable area 8 regains its initial shape without the actuation. According to one embodiment, the body 2 is made deformable by the material from which the deformable area 8 is made, for example a resilient material.

Figure 3:
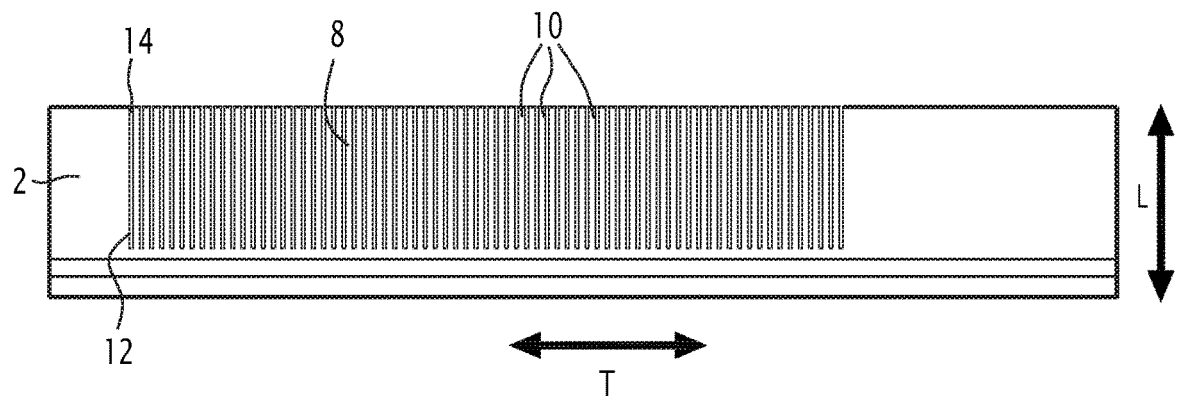
FIG. 3 is a schematic top illustration of one embodiment of the body of the trim element.
Figure 4:
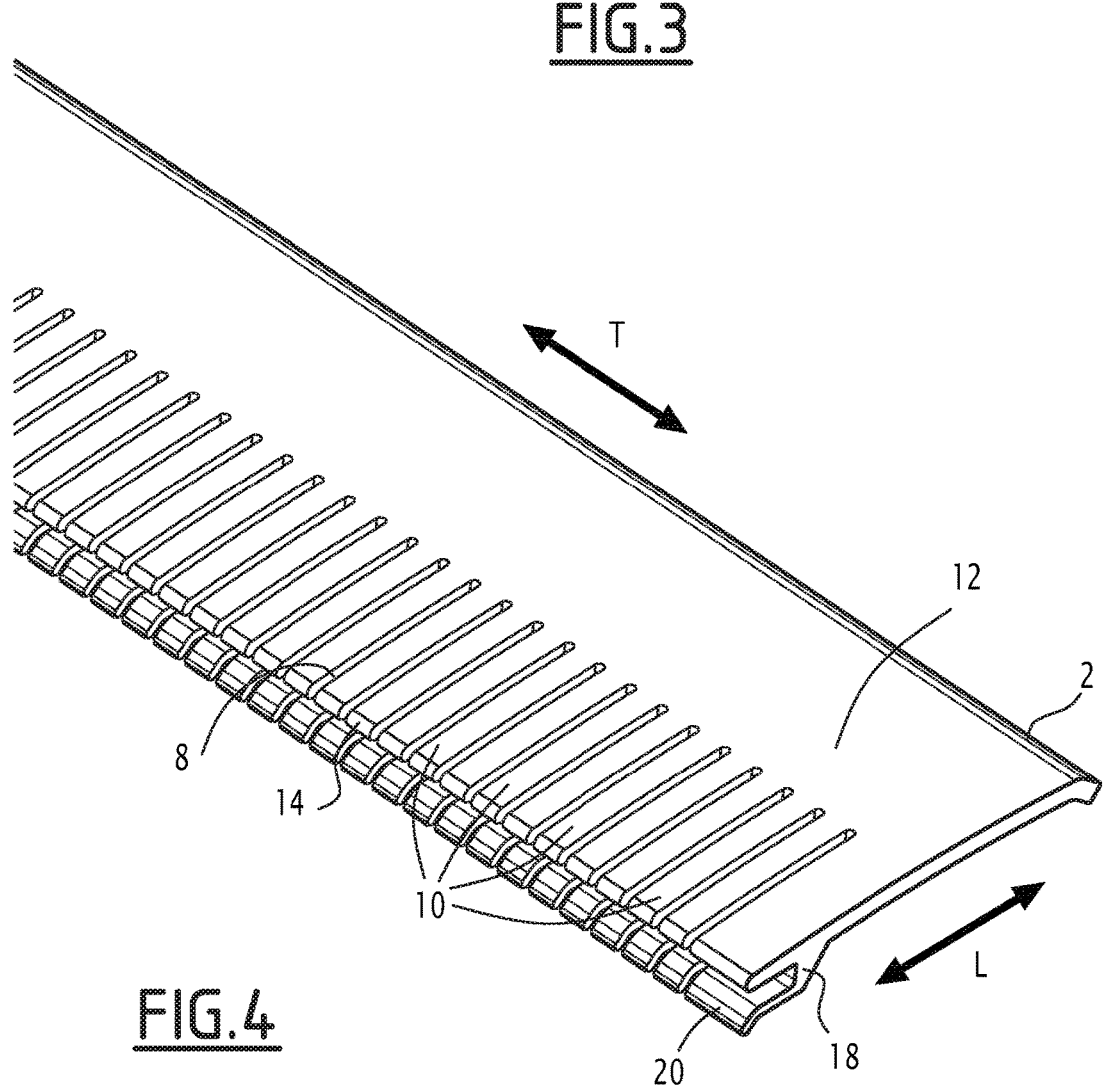
FIG. 4 is a schematic perspective illustration of another embodiment of the body of the trim element.

According to the embodiment shown in FIGS. 3 and 4, the deformable area 8 is obtained by a series of strips 10 formed in the body 2 each extending for example in a longitudinal direction L. The strips 10 are adjacent to one another in a first direction, for example the transverse direction T substantially perpendicular to the longitudinal direction L and form a part of the surface of the body 2 defining the outer surface 6 of the trim element 1. Thus, the strips 10 can be parallel to one another. Each strip 10 is for example cut in the body 2 and comprises a first end 12 secured to the rest of the body 2 and a second end 14 that is free, forming part of a transverse edge of the body 2. Due to its shape, each strip 10 is deformable relative to the rest of the body in a second direction, for example the elevation direction Z substantially perpendicular to the longitudinal L and transverse T directions, for example by rotation around a transverse axis passing near the first end 12. Thus, by exerting pressure on the second free end 14, it is possible to move the strip 10 relative to the rest of the body 2, such that the strip 10 extends in a different plane from the rest of the surface of the body 2 when it is deformed. The shape and material of the strips 10 are such that the deformation of the strips 10 is resilient. The strips 10 are for example obtained by cutting of the body 2 or by molding in a single piece with the body 2, which is for example made from a substantially rigid material by injecting a plastic material. The number of strips is in particular adapted based on the dimensions of the area to be deformed and the width of the strips.

Figure 5:
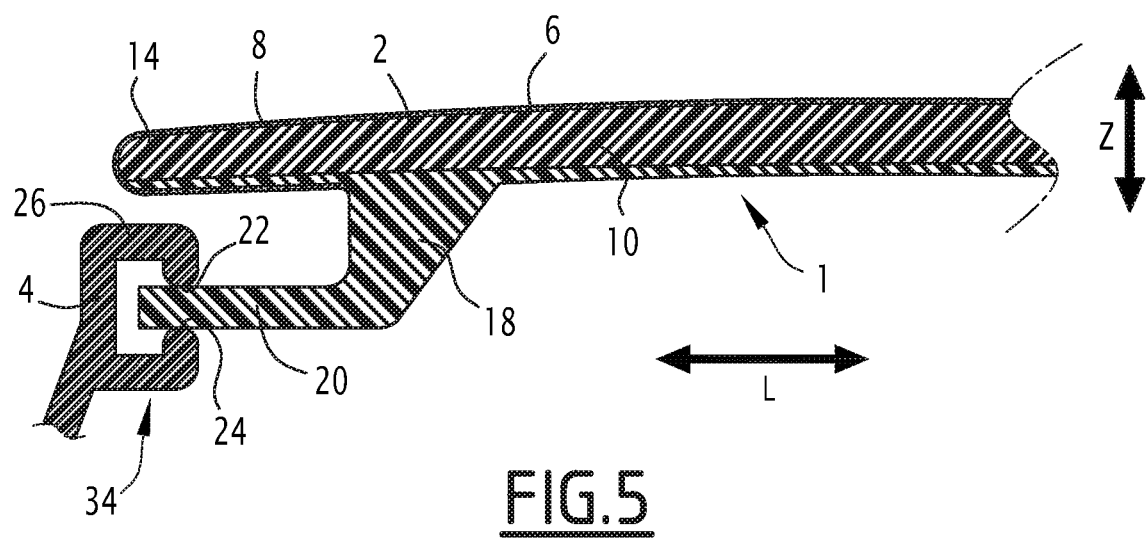
FIG. 5 is a schematic sectional illustration along axis V-V of FIG. 1, according to one embodiment of the invention.
Figure 6:
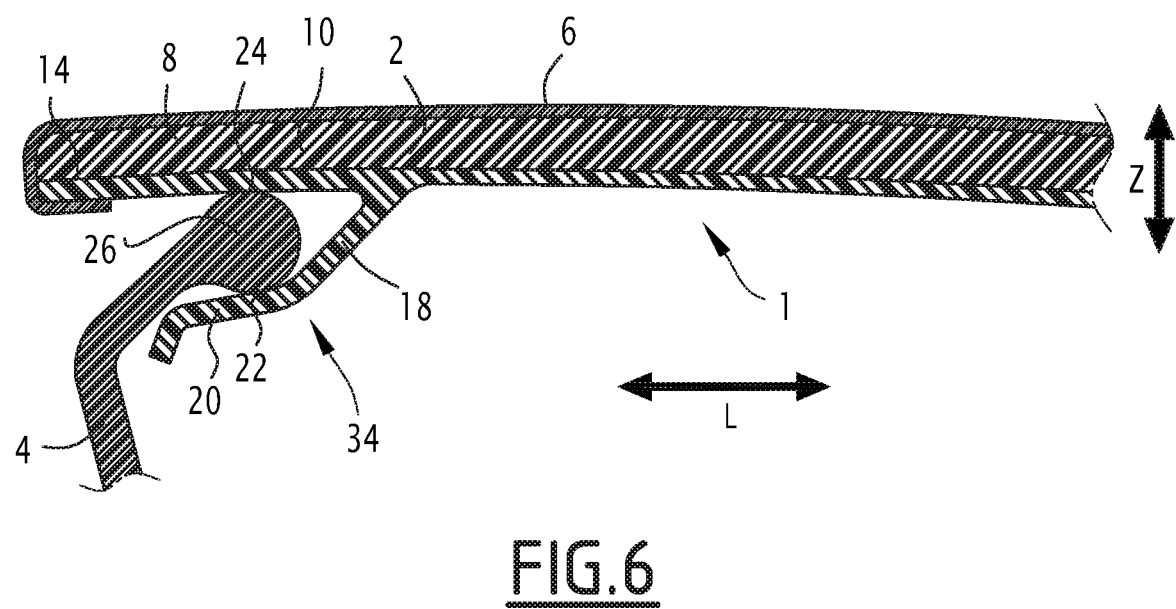
FIG. 6 is a schematic sectional illustration along axis V-V of FIG. 1, according to another embodiment of the invention.

Each strip 10 comprises, near its second free end 14, a recess 18 protruding from the face of the strip 10 opposite the face turned toward the outer surface 6 of the trim element 1. The recess 18 comprises a tongue 20 extending substantially parallel to the strip 10. The series of tongues 20 in the transverse direction forms a guide surface 22, the function of which will be described later. According to one embodiment, shown in FIG. 5, the tongues 20 are intended to cooperate with a rail 24, which will be described later. According to the embodiment shown in FIG. 6, the tongues 20 form, with the part of the strip 10 opposite them, a rail 24, as will be described later.

It should be noted that the guide surface 22 could be formed directly by the second free end 14 of the strips 10. However, providing the guide surface 22 at the end of a tongue 20, as described above, makes it possible to improve the appearance of the trim element by facilitating the concealing of the actuating element 4, as will be described later.

According to one embodiment, the second free end 14 of the strips 10 can be folded on itself to form a hook-shaped return such that the rail is formed by the hook.

The guide surface 22 extending in the transverse direction T is deformable, since each strip 10 is deformable relative to the rest of the body 2, as previously described. Such an embodiment makes it possible to make a body from a substantially rigid material while comprising a resiliently deformable area.

It should be noted that when the body 2 comprises a part that is deformable due to the material from which this part is made, the guide surface 22 extends in this part in the transverse direction so that the guide surface 22 is deformable.

In all cases, the guide surface 22 is deformable in the elevation direction Z, substantially perpendicular to the longitudinal and transverse directions, as previously described. Thus, by deforming the guide surface 22, it is possible to form hollows and protrusions in the deformable area 8 on the outer surface 6 of the trim element 1, as shown in FIGS. 1 and 2.

The actuating element 4 cooperates with the guide surface 22 in order to deform the latter and create the desired shapes in the outer surface 6 of the trim element 1, as will now be described.

The actuating element 4 is a substantially rigid part extending opposite a portion of the deformable area 8 of the body 2. The actuating element 4 for example extends below the outer surface 6 of the trim element 1 in order to be hidden by the latter from the passenger compartment of the motor vehicle.

The actuating element 4 comprises an actuating segment 26 arranged to cooperate with the guide surface 22. To that end, according to the embodiment shown in FIG. 5, the actuating segment 26 forms the rail 24, in which the tongues 20 can be inserted and guided. According to the embodiment shown in FIG. 6, the actuating segment 26 is inserted into the rail 24 formed by the tongues 20 and the strips 10 or by the hook formed by the second free end 14 of the strips 10 when they are folded on themselves. When the guide surface 22 is formed directly by the second free end 14 of the strips 10, the actuating segment 26 forms a rail in which the second free ends 14 of the strips 10 can be inserted and guided.

The actuating segment 26 extends non-rectilinearly in the transverse direction T, i.e., the actuating segment 26 undergoes at least one change of plane in the transverse direction T. This change of plane is done in the deformation direction of the guide surface 20, i.e., in the elevation direction Z in the embodiments described above. Thus, the actuating segment 26 comprises at least a first portion 28 extending rectilinearly in the transverse direction T and at least a second portion 30 extending rectilinearly in the transverse direction T and offset in the elevation direction Z relative to the first portion 28, as shown in FIGS. 1 and 2. Between the first 28 and second 30 portions, the actuating segment 26 for example comprises a third portion 32 that is inclined in the transverse direction T and joining the first portion 28 to the second portion 30.

Each portion 28, 30, 32 of the actuating segment 26 is arranged to cooperate with at least one strip 10 forming the guide surface 22. In other words, each portion 28, 30, 32 receives at least one tongue 20 or is received in the rail 24 defined by at least one tongue 20. The part of the guide surface 22 thus cooperating with the actuating segment 26 is called actuating area 34. The actuating area 34 therefore extends over at least two successive strips 10 in the transverse direction T.

Since the portions of the actuating segment 26 extend in different planes, it is understood that the tongues 20 of the strips 10 cooperating with these portions of the actuating segment are deformed to extend in the same plane as the portion with which they cooperate and that the actuating area 34 is deformed such that it adopts the shape of the actuating segment 26. This causes a deformation of the outer surface 6 of the trim element 1, as shown in FIGS. 1 and 2.

As an example, the first portion 28 of the actuating segment extends substantially in the same plane as the tongues 20 when they are not deformed and the second portion 30 of the actuating segment is offset relative to the first portion so as to create a distance between the plane of the non-deformed tongues 20 and the second portion 30. Thus, the actuating area 34 is deformed such that the outer surface 6 follows the transition between the first and second portions 28, 30 and comprises a nondeformed area opposite the first portion 28, an area inclined along the third portion 32 and a rectilinear area along the transverse direction following the second portion 30, which creates a hollow area in the outer surface 6 of the trim element 1 when the second portion 30 extends at a height, measured in the elevation direction Z, below the height of the first portion 28, as shown in FIGS. 1 and 2. By providing a second portion 30 extending at a height greater than the height of the first portion 28, it is understood that the actuating area 34 creates a protruding area in the outer surface 6. Due to the deformation of the actuating area 34, strips 10 adjacent to the strips 10 of the actuating area 34 are also deformed due to the constraint applied by the actuating segment 26 on the guide surface 22, as more particularly shown in FIG. 2.

In order for the deformation of the actuating area 34 to be gradual, it is advantageous for several adjacent strips to cooperate with each of the portions 28, 30, 32 of the actuating segment 26.

It is understood that by providing more portions in the actuating segment and by modifying the shape of the segment, it is possible to choose the shape of the desired deformation in the outer surface 6. Thus, it is possible to create deformations such that the outer surface 6 comprises one or several hollow areas and one or several protruding areas.

It will be noted that the deformed area retains a certain rigidity, since it is bearing on the actuating element 4, which is rigid. Thus, the feel and the mechanical strength of the outer surface 6 are substantially the same over the entire surface, including in the deformed area.

It is provided to allow the movement of the deformed area in order to give the outer surface 6 a configurable and adjustable shape depending on the desires of the passengers of the vehicle and/or depending on the operating modes of the vehicle, as will be described later.

To that end, the actuating element 4 is mounted movably relative to the body 2 in the transverse direction T such that the actuating segment 26 can move along the guide surface 22 in the transverse direction T. This movement causes a movement of the actuating area 34 and therefore a gradual change of the strips 10, which cooperate with the portions 28, 30, 32 of the actuating segment 26. It will thus be understood that the deformed area moves with the movement of the actuating segment 26, as can be seen in FIGS. 1 and 2, between which the actuating element 4 has been moved. During the movement, some strips 10 stop cooperating with the actuating segment 26 and can return to their initial position if the stresses applied by the actuating segment allow it, while others begin to cooperate with the actuating segment and deform according to the portion of the actuating segment 26 with which they cooperate. Thus, the movement of the deformation is done continuously and aesthetically, while giving an impression of a wave that moves over the outer surface 6 of the trim element.

The movement of the actuating element 4 is for example controlled by the control electronics of the vehicle, which makes it possible to move the actuating element 4 in a synchronized manner with other elements of the vehicle, as will be described later.

The movement of the actuating element 4 can also be controlled by a pneumatic or manual system.

According to the embodiment shown in FIGS. 1 and 2, the trim element 1 comprises two actuating elements 4, each being movable relative to the body 2 in the transverse direction T and cooperating with the guide surface 22 in two distinct actuating areas 34.

According to this embodiment, which is provided solely as an example, the actuating elements 4 are such that the two portions 30 of the actuating segments 26 opposite one another such that they extend in the continuation of one another when the actuating elements 4 are brought closer to one another, in a closed position, in which the actuating areas 34 are adjacent to one another, as shown in FIG. 1. In this position, the deformed area of the outer surface 6 thus has, between the actuating areas 34, a basin shape whereof the bottom extends in the actuating areas 34 and having inclined walls opposite the third portions 32 of the actuating segments and an inclined wall along the longitudinal direction L toward the actuating areas 34.

By moving the two actuating elements 4 in the same direction and in a coordinated manner such that they stay adjacent to one another, it is possible to move the basin in the transverse direction T, for example from a first position to a second position.

It is also possible to enlarge the dimensions of the bottom of the basin by moving the actuating elements 4 independently of one another so as to move them away from one another as shown in FIG. 2. Thus, the trim element 1 offers great configurability in the appearance that can be imparted to the outer surface, while retaining uniform rigidity and feel properties over the entire outer surface.

The embodiment shown in FIGS. 1 and 2 is particularly advantageously when it is used with a trim element forming a vehicle dashboard. The hollow deformation can indeed be placed opposite a display device of the vehicle, such as a screen. In a position where the basin has a reduced size, the latter can be placed opposite the driver in order to create a limited visibility area on the screen, such that the driver focuses on information relative to driving the vehicle displayed on an area of the screen opposite the basin. By enlarging the basin and moving it substantially to the center of the trim element in the transverse direction, it is possible to enlarge the visibility area in order to allow the passengers to see a larger part of the screen, for example when the vehicle is in an autonomous driving configuration, in which the driver does not participate in the driving of the vehicle.

It is, however, understood that the invention can be used in other contexts, for example to move an area protruding from the outer surface in order to form a support surface for a limb of a passenger of the motor vehicle to the desired location based on the position of the passenger's seat and/or the morphology of the passenger. Such a support surface is for example an armrest or a footrest or the like.

In all cases, the movement of the actuating element(s) 4 can advantageously be coordinated with the movement of other elements of the vehicle, such as the display device or the seat described above.

The description has been done considering the first direction to be the transverse direction T and the second direction to be the elevation direction Z. It is, however, understood that the first and second directions can be different by adapting the orientation of the elements of the trim element accordingly.

The invention claimed is:

1. A vehicle trim element, comprising a body defining an outer surface of the trim element, at least part of said body being deformable, such that the deformation of said part of the body causes a modification of the shape of the outer surface of the trim element, said body comprising a deformable guide surface extending in a first direction, wherein the trim element further comprises at least one actuating element comprising an actuating segment extending non-rectilinearly in the first direction, said actuating segment cooperating with the guide surface in an actuating area, the guide surface adopting the shape of the actuating segment in said actuating area, the actuating segment being movable relative to the body in the first direction such that the actuating area is movable and the body deforms when the actuating element is moved in the first direction relative to the body.

2. The trim element according to claim 1, wherein the guide surface is formed by a series of strips adjacent to one another in the first direction, each strip being deformable relative to the rest of the body in a second direction substantially perpendicular to the first transverse direction, the actuating area extending over at least two of said strips.

3. The trim element according to claim 2, wherein each strip is resiliently deformable relative to the rest of the body.

4. The trim element according to claim 2, wherein the actuating segment comprises at least a first portion extending rectilinearly in the first direction and a second portion extending rectilinearly in the first direction, the first portion and the second portion being offset relative to one another in the second direction, at least one strip cooperating with the first portion and at least one other strip cooperating with the second portion in the actuating area.

5. The trim element according to claim 4, wherein the actuating segment comprises at least a third portion extending between the first portion and the second portion, said third portion being inclined between the first portion and the second portion, at least one other strip cooperating with the third portion in the actuating area.

6. The trim element according to claim 1, comprising at least two actuating elements movable independently of one another or in a coordinated manner in the first direction relative to the body, each actuating element cooperating with a part of the guide surface of the body in two separate actuating areas.

7. The trim element according to claim 6, wherein the actuating elements are movable relative to one another between a close position, in which the actuating areas are adjacent to one another, and a separated position, in which the actuating areas are separated from one another.

8. The trim element according to claim 6, wherein the actuating elements are movable in a coordinated manner between at least a first position and a second position, the actuating areas moving together in the first direction between the first position and the second position.

9. The trim element according to claim 6, wherein the actuating segments have a shape such that the outer surface of the trim element has a basin shape between the actuating areas.

10. The trim element according to claim 1, wherein the guide surface has a rail shape, the actuating segment being inserted into said rail in the actuating area and extending outside the rail outside the actuating area.

11. The trim element according to claim 1, wherein the actuating segment has a rail shape, the guide surface being inserted into said rail in the actuating area and extending outside the rail outside the actuating area.

* * * * *